US012649873B1

(12) United States Patent
George et al.

(10) Patent No.: US 12,649,873 B1
(45) Date of Patent: Jun. 9, 2026

(54) SOREL CEMENT WITH A HYDROPHOBIC MODIFIER

(71) Applicant: Halliburton Energy Services, Inc., Houston, TX (US)

(72) Inventors: Shoy George, Pune (IN); Larry Eoff, Houston, TX (US); Sudhir Nimane, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/044,307

(22) Filed: Feb. 3, 2025

(51) Int. Cl.

| | |
|---|---|
| *C09K 8/467* | (2006.01) |
| *C04B 14/10* | (2006.01) |
| *C04B 20/10* | (2006.01) |
| *C04B 22/10* | (2006.01) |
| *C04B 22/16* | (2006.01) |
| *C04B 24/38* | (2006.01) |
| *C04B 28/32* | (2006.01) |
| *C09K 8/504* | (2006.01) |
| *C09K 8/506* | (2006.01) |
| *E21B 21/00* | (2006.01) |
| *E21B 33/138* | (2006.01) |
| *C04B 103/00* | (2006.01) |
| *C04B 103/65* | (2006.01) |

(52) U.S. Cl.
CPC .............. *C09K 8/467* (2013.01); *C04B 14/10* (2013.01); *C04B 20/1025* (2013.01); *C04B 22/10* (2013.01); *C04B 22/16* (2013.01); *C04B 24/38* (2013.01); *C04B 28/32* (2013.01); *C09K 8/5045* (2013.01); *C09K 8/506* (2013.01); *E21B 21/003* (2013.01); *E21B 33/138* (2013.01); *C04B 2103/0079* (2013.01); *C04B 2103/65* (2013.01)

(58) Field of Classification Search
None
See application file for complete search history.

(56) References Cited

U.S. PATENT DOCUMENTS

| | | | |
|---|---|---|---|
| RE28,781 E | 4/1976 | König et al. | |
| 4,455,171 A | * 6/1984 | Spensley ............. | E21D 20/023 |
| | | | 106/696 |
| 4,753,679 A | 6/1988 | Damiano et al. | |
| 8,580,141 B2 | 11/2013 | Khanna et al. | |
| 8,720,557 B2 | 5/2014 | Patil et al. | |
| 9,587,164 B2 | 3/2017 | Patil et al. | |

(Continued)

FOREIGN PATENT DOCUMENTS

| | | |
|---|---|---|
| CN | 117801583 A | 4/2024 |
| EP | 4206159 A1 | 7/2023 |
| EP | 4382502 A1 | 6/2024 |

OTHER PUBLICATIONS

International Search Report and Written Opinion for International Patent Application No. PCT/US2025/051336 dated Feb. 12, 2026. PDF file. 8 pages.

*Primary Examiner* — Andrew Sue-Ako
(74) *Attorney, Agent, or Firm* — Thomas Rooney; C. Tumey Law Group PLLC

(57) ABSTRACT

A variety of methods, systems, and compositions are disclosed, including, in one embodiment, a cement composition comprising an alkaline earth metal oxide, a soluble salt, a water-proofing agent comprising a divalent cation carbonate coated with fatty acid, and water. In other embodiments, the cement composition is introduced and allowed to set in a subterranean formation.

20 Claims, 5 Drawing Sheets

(56)          References Cited

U.S. PATENT DOCUMENTS

| | | | |
|---|---|---|---|
| 9,587,473 | B2 | 3/2017 | Patil et al. |
| 9,611,420 | B2 | 4/2017 | George et al. |
| 9,644,135 | B2 | 5/2017 | Sarda-Mantri et al. |
| 9,676,992 | B2 | 6/2017 | Chittattukara et al. |
| 9,784,079 | B2 | 10/2017 | Salla et al. |
| 9,969,924 | B2 | 5/2018 | Chittattukara et al. |
| 10,047,269 | B2 | 8/2018 | Chittattukara et al. |
| 10,174,241 | B2 | 1/2019 | Eoff et al. |
| 10,316,240 | B2 | 6/2019 | Patil et al. |
| 10,550,307 | B2 | 2/2020 | Patil et al. |
| 10,876,031 | B2 | 12/2020 | Dandawate et al. |
| 10,876,045 | B2 | 12/2020 | Holtsclaw et al. |
| 10,954,431 | B2 | 3/2021 | Chittattukara et al. |
| 10,982,126 | B2 | 4/2021 | Escobar et al. |
| 11,091,977 | B2 | 8/2021 | Belakshe et al. |
| 11,254,860 | B2 | 2/2022 | Eoff et al. |
| 11,286,417 | B2 | 3/2022 | George et al. |
| 11,401,453 | B2 | 8/2022 | Larsen et al. |
| 11,407,934 | B2 | 8/2022 | Eoff et al. |
| 11,466,193 | B2 | 10/2022 | Beuterbaugh et al. |
| 11,466,200 | B2 | 10/2022 | Beuterbaugh et al. |
| 11,572,497 | B2 | 2/2023 | Larsen et al. |
| 11,578,252 | B2 | 2/2023 | Larsen et al. |
| 11,661,815 | B1 | 5/2023 | Quero et al. |
| 11,667,828 | B2 | 6/2023 | Larsen et al. |
| 11,802,231 | B2 | 10/2023 | Larsen et al. |
| 11,820,937 | B2 | 11/2023 | Pindiprolu et al. |
| 11,827,848 | B2 | 11/2023 | Shen et al. |
| 11,891,873 | B2 | 2/2024 | Recio, III et al. |
| 11,920,080 | B2 | 3/2024 | Beuterbaugh et al. |
| 11,945,993 | B2 | 4/2024 | Deshpande et al. |

| | | | |
|---|---|---|---|
| 2009/0107677 | A1* | 4/2009 | James .................. C09K 8/506 |
| | | | 507/269 |
| 2010/0023375 | A1 | 1/2010 | Tomlin et al. |
| 2013/0180713 | A1 | 7/2013 | Patil et al. |
| 2013/0333886 | A1 | 12/2013 | George et al. |
| 2014/0087974 | A1* | 3/2014 | Villarreal ........... C04B 20/1011 |
| | | | 166/305.1 |
| 2014/0311740 | A1 | 10/2014 | Patil et al. |
| 2014/0329724 | A1 | 11/2014 | George et al. |
| 2016/0160114 | A1 | 6/2016 | Chittattukara et al. |
| 2016/0280985 | A1 | 9/2016 | Sarda-Mantri et al. |
| 2016/0333249 | A1 | 11/2016 | Patil et al. |
| 2016/0376490 | A1 | 12/2016 | Salla et al. |
| 2017/0275517 | A1 | 9/2017 | Chittattukara et al. |
| 2017/0342273 | A1 | 11/2017 | Tuan et al. |
| 2018/0208825 | A1 | 7/2018 | Salla et al. |
| 2018/0346801 | A1 | 12/2018 | Dandawate et al. |
| 2019/0093000 | A1 | 3/2019 | Agashe et al. |
| 2020/0283677 | A1 | 9/2020 | Chittattukara et al. |
| 2020/0377781 | A1 | 12/2020 | Larsen et al. |
| 2021/0017439 | A1* | 1/2021 | Ramirez Angulo ... C09K 8/506 |
| 2021/0062074 | A1 | 3/2021 | Eoff et al. |
| 2021/0101833 | A1* | 4/2021 | Themlitz .............. C04B 38/103 |
| 2021/0292634 | A1 | 9/2021 | Larsen et al. |
| 2021/0363404 | A1 | 11/2021 | Larsen et al. |
| 2021/0363414 | A1 | 11/2021 | Beuterbaugh et al. |
| 2021/0363415 | A1 | 11/2021 | Eoff et al. |
| 2022/0074212 | A1* | 3/2022 | Boucké ................ B32B 27/065 |
| 2022/0315827 | A1 | 10/2022 | Larsen et al. |
| 2022/0403710 | A1 | 12/2022 | Recio, III et al. |
| 2022/0411689 | A1 | 12/2022 | Beuterbaugh et al. |
| 2023/0036729 | A1 | 2/2023 | Deshpande et al. |
| 2023/0047741 | A1 | 2/2023 | Wambaugh et al. |
| 2023/0136892 | A1 | 5/2023 | Larsen et al. |

* cited by examiner

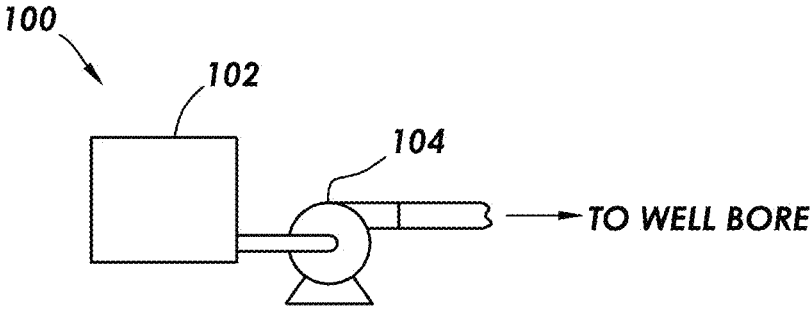
*F*IG.1
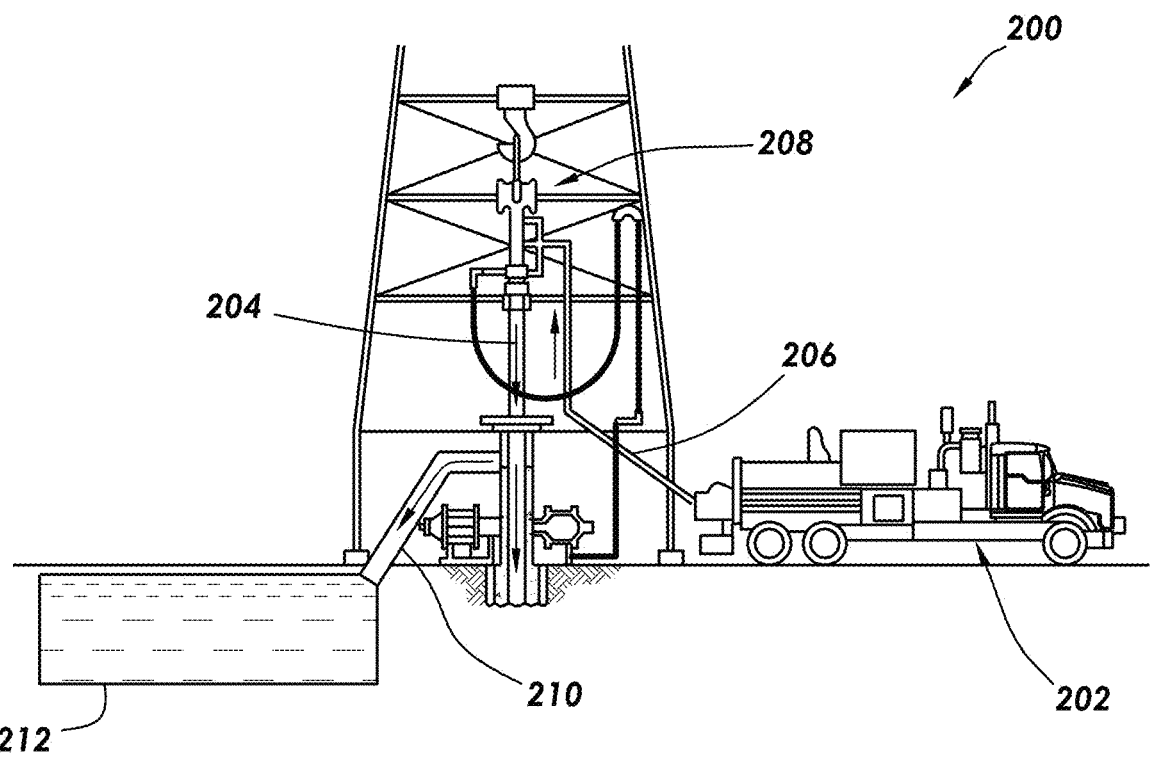
*F*IG.2A

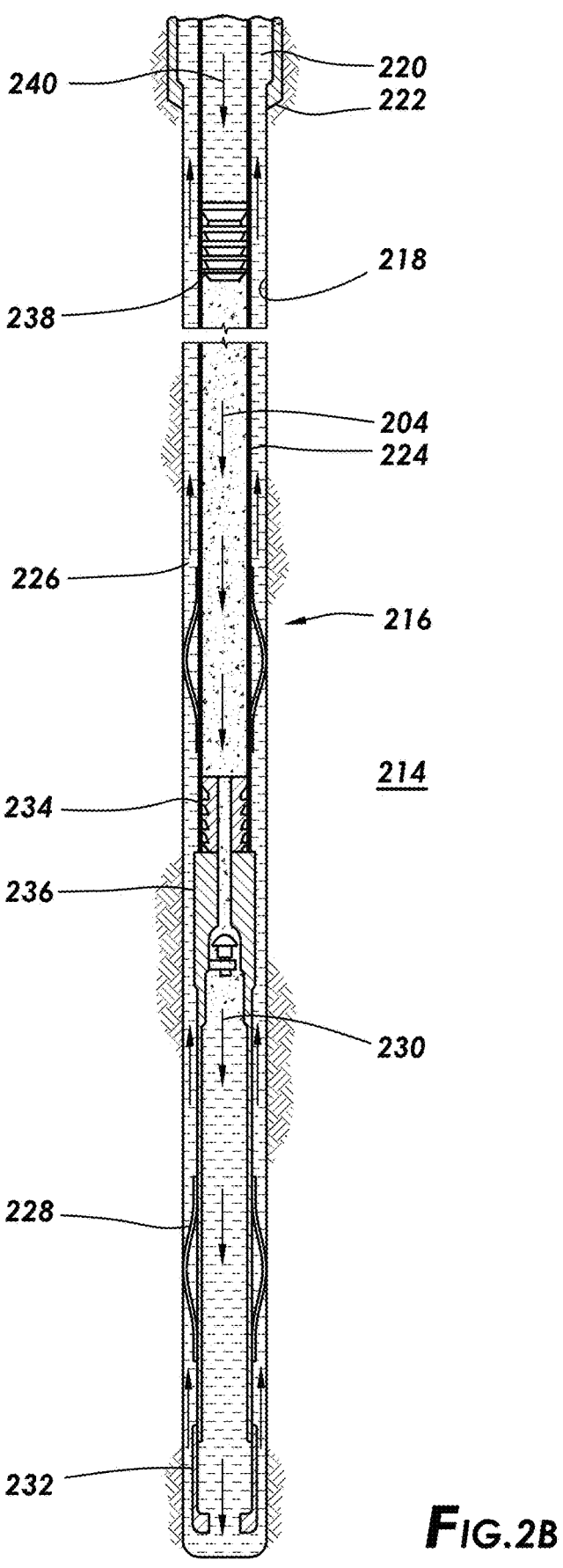
240
220
222
238
218
204
224
226
216
214
234
236
230
228
232
*F*IG.2B

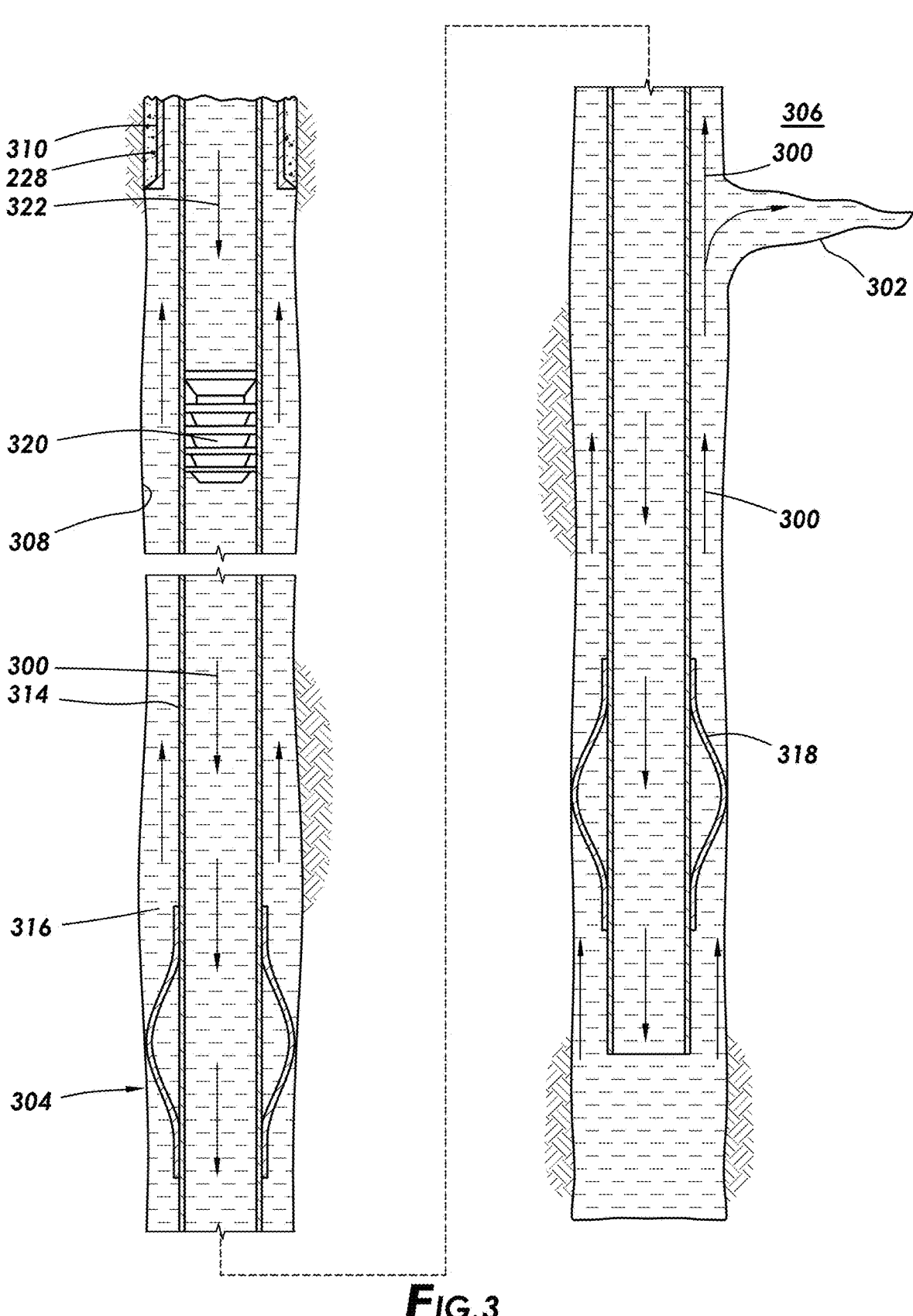
*F*IG.3

SOREL CEMENT WITH A HYDROPHOBIC MODIFIER

BACKGROUND

When performing a subterranean treatment operation, it may be desirable to temporarily or permanently block or divert the flow of a fluid within at least a portion of the subterranean formation by forming a fluid seal therein. Whether the fluid seal is intended to be temporary or permanent may determine the type of agent used in its formation. Illustrative fluid blocking and diversion operations can include, without limitation, fluid loss control operations, kill operations, conformance control operations, and the like. The fluid that is being blocked or diverted may be a formation fluid that is natively present in the subterranean formation, such as petroleum, gas, or water. In other cases, the fluid that is being blocked or diverted may be a treatment fluid. In some cases, treatment fluids may be formulated to be self-diverting, such that they are automatically directed to a desired location within the subterranean formation.

Providing effective fluid loss control during subterranean treatment operations may be highly desirable. The term "fluid loss," as used herein, refers to the undesired migration or loss of fluids into a subterranean formation and/or a particulate pack. Fluid loss may be problematic in a number of subterranean operations including, for example, drilling operations, fracturing operations, acidizing operations, gravel-packing operations, workover operations, chemical treatment operations, wellbore clean-out operations, and the like. In fracturing operations, for example, fluid loss into the formation matrix may result in incomplete fracture propagation. Formation of a fluid seal in such treatment operations may mitigate the migration of a fluid into an unwanted location of the subterranean formation. Likewise, in the reverse of a fluid loss event, incomplete fluid blocking may result in production of an unwanted fluid from one or more zones of a subterranean formation. For example, incomplete formation of a fluid seal may result in the unwanted incursion of formation water or brine into a wellbore, which may decrease the value of a hydrocarbon resource produced therefrom.

Lost circulation treatments involving various plugging materials such as walnut hulls, mica, and cellophane have been used to prevent or lessen the loss of fluids from wellbores. The disadvantages of such treatments include the potential for damage to subterranean formations because of the inability to remove the plugging materials therefrom, and the dislodgement of the plugging materials from highly permeable zones whereby fluid losses subsequently resume. Cement compositions may also be used to seal cracks or holes in pipe strings or cement sheaths, to seal highly permeable formation zones or fractures, to place a cement plug, and the like. One technique for preventing lost circulation problems has been to temporarily plug voids or permeable zones with Sorel cement compositions. Sorel cement compositions typically include magnesium oxide and a chloride or phosphate salt which together form magnesium oxychloride, for example.

BRIEF DESCRIPTION OF THE DRAWINGS

These drawings illustrate certain aspects of some of the embodiments of the present disclosure and should not be used to limit or define the disclosure.

FIG. 1 is a schematic diagram that illustrates a system for preparation and delivery of a cement composition according to embodiments of the present disclosure;

FIG. 2A is a schematic diagram that illustrates surface equipment that may be used for introduction and placement of a cement composition according to embodiments of the present disclosure;

FIG. 2B is a schematic diagram that illustrates placement of a cement composition into a wellbore annulus according to embodiments of the present disclosure;

FIG. 3 is a schematic diagram that illustrates placement of a cement composition into a wellbore annulus in accordance with certain examples in the present disclosure;

DETAILED DESCRIPTION

Figure 4:
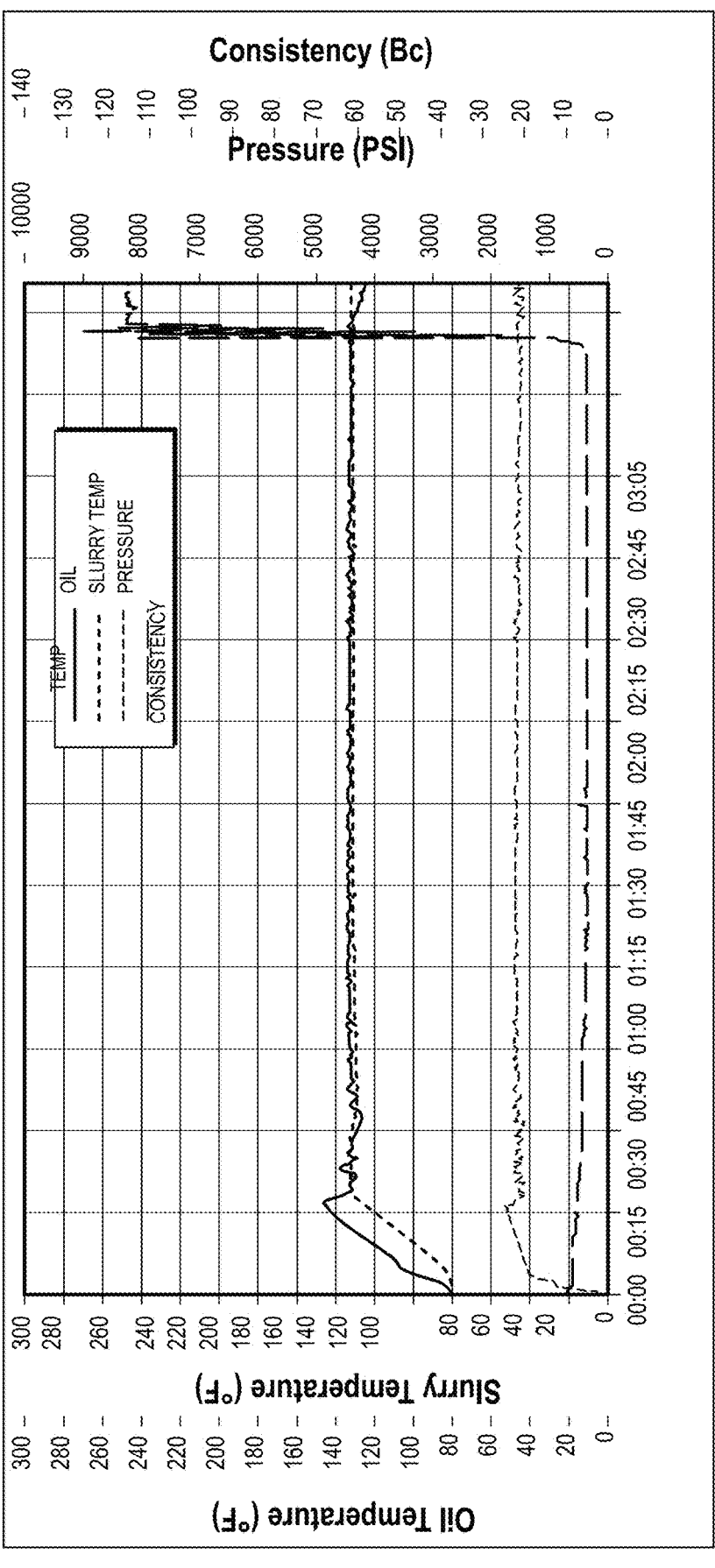
FIG. 4 illustrates the thickening time measured at 55° C. using a cement composition according to embodiments of the present disclosure.
Figure 5:
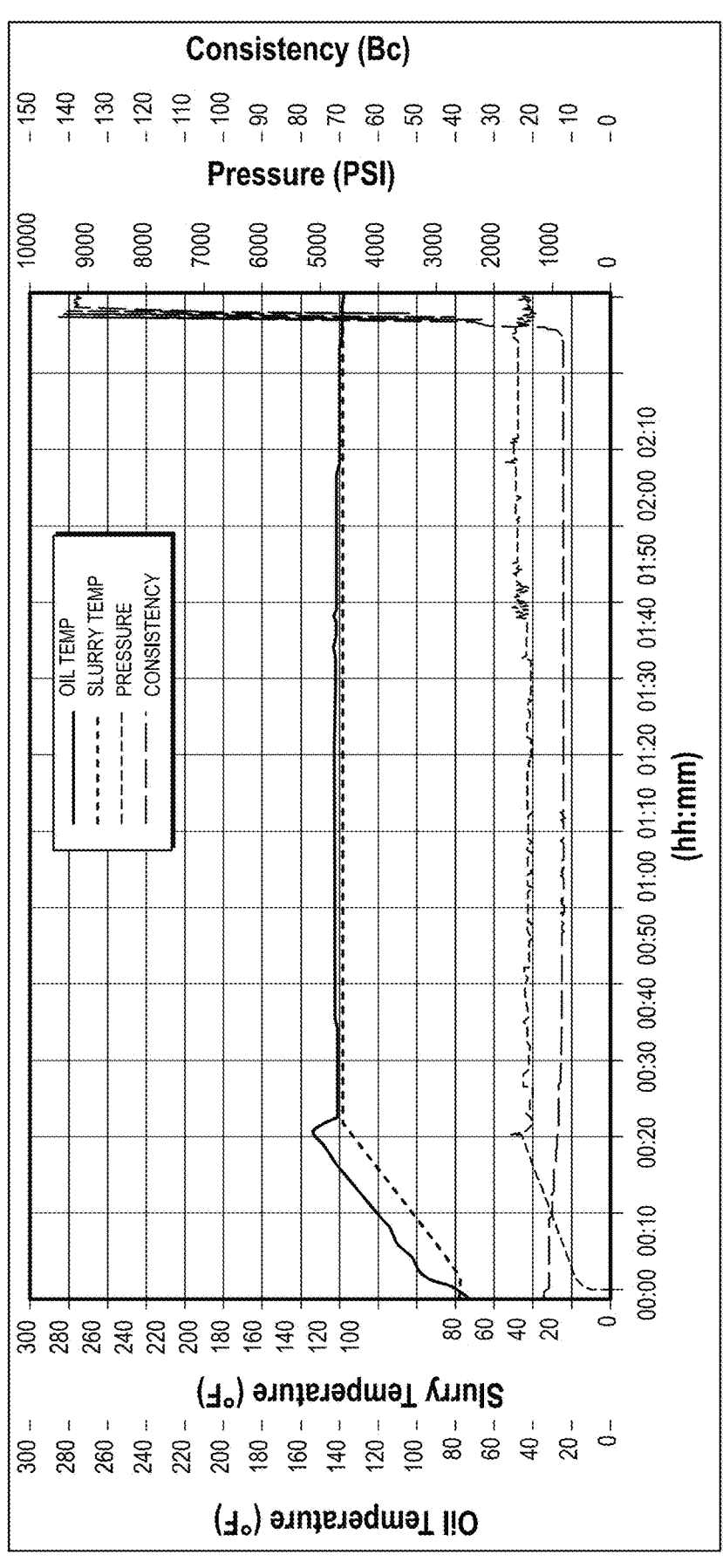
FIG. 5 illustrates the thickening time measured at 60° C. using a cement composition according to embodiments of the present disclosure.

Disclosed herein are methods, compositions, and systems relating to subterranean cementing operations, and, more particularly, to subterranean cementing operations including magnesium oxychloride (Sorel) cement compositions including divalent cation carbonate coated with fatty acid as water-proofing agents. The divalent cation carbonate may be any carbonate with a divalent cation including calcium carbonate, magnesium carbonate, strontium carbonate, zinc carbonate, or any combination, for example. The fatty acid may be any carboxylic acid having a hydrocarbon chain and a terminal carboxyl group including short-chain fatty acids such as butyric acid, medium-chain fatty acids such as caprylic acid, capric acid, lauric acid, long-chain fatty acids such as myristic acid, palmitic acid, stearic acid, arachidic acid, and very long chain fatty acids such as behenic acid, lignoceric acid, cerotic acid, or any combination, for example. In embodiments, the Sorel cement compositions including calcium carbonate coated with stearic acid enhance thermal stability, improves hydrophobicity in contact with an aqueous media, and facilitate handling in field operation.

Sorel cement compositions may include magnesia-based cement systems formed from a mixture of magnesium oxide and magnesium chloride. However, as used herein, the term "Sorel cement composition" may encompass cements formed from any of a variety of metal oxides and soluble salts which together form a settable cement composition. In the presence of water, the metal oxide and the soluble salt forming the Sorel cement composition may solidify into a hardened mass. Sorel cement compositions may rapidly develop a desirable compressive strength. However, Sorel cement composition may rapidly degrade (fall apart) when immersed in water.

Sorel cement, also known as magnesium oxychloride cement (MOC), exhibits limited resistance to water and deteriorates significantly in moist conditions or when submerged in water. This degradation is primarily due to the leaching of magnesium chloride ($MgCl_2$) from the magnesium oxychloride cement. Research indicates that the compressive strength of magnesium oxychloride cement diminishes sharply upon exposure to water, leading to damage within the cement matrix. Consequently, this accelerates water infiltration and causes further deterioration of the Sorel cement block. According to the present disclosure, a surprising result may be achieved by essentially replacing conventional water-proofing agents with a divalent cation carbonate coated with fatty acid in that the Sorel cements can have acceptable water resistance while also providing acceptable environmental characteristics. The divalent cation carbonate coated with fatty acid may stabilize the Sorel cement composition while having environmental characteristics that are acceptable in regulated areas.

Sorel cement compositions according to the present disclosure may include an alkaline earth metal oxide, a soluble salt, a water-proofing agent, and water, wherein the water-proofing agent includes a divalent cation carbonate coated with fatty acid. Additional additives may be included in the Sorel cement composition as desired by one of ordinary skill in the art.

The Sorel cement composition may include a metal oxide. In some examples, the Sorel cement may include an alkaline earth metal oxide, such as magnesium oxide, zinc oxide, or aluminum oxide. Another example of a suitable metal oxide includes zinc oxide. The metal oxide present in the Sorel cement may have an activity level sufficient to provide the desired reactivity. For example, the higher the activity level of the metal oxide, the faster the reaction of the metal oxide with the other components of the Sorel cement to form the hardened mass. The activity level of the metal oxide may vary based on several factors. For example, the particle size differential of the metal oxide particles may affect the activity level. A smaller particle size differential may result in a higher activity level due, inter alia, to a greater surface area. Another factor that may affect the activity level of the metal oxide is a sintering process. By varying the heat applied during the sintering process, metal oxide with varying activity levels may be provided. Metal oxide that has not been treated by a sintering process may have a very high activity level, and thus it may be highly reactive in the Sorel cements. In an embodiment, a relatively more reactive metal oxide may be desired, such as where it may be desired to have a cement composition with a relatively short set time, for example, when desired to rapidly seal off a permeable zone. In an alternative embodiment, a relatively less reactive metal oxide may be desired, for example, where a delay may be desired between mixing the cement composition and the formation of a hardened mass.

The metal oxide may be present in the Sorel cement composition in any suitable amount. In some embodiments, the metal oxide may be present in the Sorel cement composition in an amount of about 5% to about 50% by weight of the Sorel cement composition, including about 5% to about 40%, about 5% to about 20%, about 5% to about 10%, about 10% to about 50%, or about 30% to about 50%. One of ordinary skill in the art, with the benefit of this disclosure, should recognize the appropriate amount of the metal oxide to include for a chosen application.

A wide variety of soluble salts are suitable for use in the Sorel cement compositions, including metal chlorides. In some examples, the Sorel cement may include an alkaline earth metal chloride, such as magnesium chloride and zinc chloride. In an alternative embodiment, the Sorel cement includes magnesium sulfate or ammonium mono or dibasic phosphate such as ammonium dihydrogen phosphate ($(NH_4)(H_2PO_4)$) or ammonium hydrogen phosphate ($(NH_4)_2HPO_4$), for example. The soluble salt may be present in the Sorel cement composition in any suitable amount. In some embodiments, the soluble salt may be present in the Sorel cement composition in an amount of about 5% to about 50% by weight of the Sorel cement composition, including about 5% to about 40%, about 5% to about 20%, about 5% to about 10%, about 10% to about 50%, about 30% to about 50%, about 10% to about 40%, or about 20% to about 40%. One of ordinary skill in the art, with the benefit of this disclosure, should recognize the appropriate amount of the soluble salt to include for a chosen application.

The Sorel cement may include the metal oxide and the soluble salt in a metal oxide to soluble salt ratio of about 1:3 to about 3:1. In some examples, the metal oxide to soluble salt ratio may range from about 1:2 to about 2:1. In other examples, the metal oxide to soluble salt ratio may range from about 1:1.5 to about 1.5:1. One of ordinary skill in the art will recognize the appropriate ratio of the metal oxide and soluble salt to include for a particular application.

The metal oxide and metal chloride should react to form a hardened mass. For example, a metal oxide (e.g., magnesium oxide powder) may be combined with a solution of magnesium chloride, thereby forming the principal phases of $Mg_3(OH)_5Cl\cdot4H_2O$ and $Mg_2(OH)_3Cl\cdot4H_2O$. Two additional phases may be also formed including $Mg_2OHClCO_3\cdot H_2O$ and $Mg_5(OH)_2(CO_3)_4\cdot4H_2O$. Dissolution of the magnesium in the magnesium chloride solution leads to formation of a gel and occurs before the crystallization of the other hydrates takes place. While the resulting cement may have desirable compressive strength and sealant properties, among others, it may be susceptible to degradation, for example, from water. Accordingly, water proofing agents can be included in the Sorel cement composition in accordance with present embodiments.

Examples of suitable water-proofing agents include divalent cation carbonate coated with fatty acid. As previously described, these water-proofing agents may have acceptable environmental ratings thus allowing their use in regions where conventional water-proofing agents may be limited. For example, the water-proofing agents may have a yellow or green environmental rating such that the resultant Sorel cement composition may also have a yellow or green environmental rating. Further, the Sorel cement compositions including divalent cation carbonate coated with fatty acid enhance thermal stability and facilitate handling in field operation.

As described above, the divalent cation carbonate may be any carbonate with a divalent cation including calcium carbonate, magnesium carbonate, strontium carbonate, zinc carbonate, or any combination thereof, for example. The fatty acid may be any carboxylic acid having a hydrocarbon chain with a chain length and a terminal carboxyl group including short-chain fatty acids such as butyric acid, medium-chain fatty acids such as caprylic acid, capric acid, lauric acid, long-chain fatty acids such as myristic acid, palmitic acid, stearic acid, arachidic acid, and very long chain fatty acids such as behenic acid, lignoceric acid, cerotic acid, or any combination, for example. The fatty acid may have any hydrocarbon chain length ranging from 3 carbons to 50 carbons, from 4 carbons to 30 carbons, or from 10 carbons to 20 carbons, for example.

Any suitable technique may be used to coat the divalent cation carbonate with the fatty acid. The coating does not necessarily have to be a complete coating. For example, the carbonate may be coated on 100% of its surface or less such as 99%, 95%, 90%, 85%, 80%, 75%, 50% or any value in between, for example. In other embodiments, the water-proofing agent may be any surface coated with a divalent cation as intermediate layer, which is coated with the fatty acid. The surface or carbonate may be coated on 100% of its surface or less such as 99%, 95%, 90%, 85%, 80%, 75%, 50% or any value in between, for example.

The divalent cation carbonate may be coated with any suitable amount of the fatty acid. For example, fatty acid coated with carbonates may be synthesized by a reaction between carbonate and fatty acid or by spray coating.

In some embodiments, the water-proofing agent may be used to eliminate or reduce the concentration of modified clay in the Sorel cement compositions enhancing its thermal stability, its resistance to water diffusion, and lowering its viscosity. The lower viscosity improves the mixability of the system, making the mixing process easier, and the system handling operation in the field much friendlier.

The water-proofing agent may be included in the Sorel cement compositions in any suitable amount. For example, the water-proofing agent may be present in the Sorel cement compositions in an amount of about 1% to about 50% by weight of the cement composition, including an amount of about 2% to about 30%, about 4% to about 10%, about 5% to about 20%, about 10% to about 20%, or about 10% to about 30%. One of ordinary skill in the art, with the benefit of this disclosure, should recognize the appropriate amount of the water-proofing agent to include for a chosen application.

The water that may be used in Sorel cement compositions may include freshwater, saltwater (e.g., water containing one or more salts dissolved therein), brine (e.g., saturated saltwater, including brines produced from subterranean formations), seawater, or combinations thereof. Generally, the water may be from any source, provided that the water does not contain an excess of compounds that may undesirably affect other components in the Sorel cement composition. In some examples, the water may be included in an amount sufficient to form a pumpable slurry. The water may be present in the Sorel cement composition in an amount of about 20% to about 40% by weight of the Sorel cement composition. One of ordinary skill in the art, with the benefit of this disclosure, should recognize the appropriate amount of water to include for a chosen application.

Optionally, other additional additives may be added to the Sorel cement compositions as deemed appropriate by one skilled in the art, with the benefit of this disclosure. Examples of such additives may include fillers, viscosifiers, accelerators, and weighting agents. Fillers can be used, in some embodiments, to modify the particle size distribution of the composition, for example to prevent packing of the preferred ultra-fine metal oxide particles. Undue packing can impair the flow of the Sorel cement composition. Increasing the particle size distribution with fillers can minimize packing and contribute to flow. The fillers may also be provided to add greater suspension properties for weight additives at lower weights and can be selected to aid in packing off micro fractures in the wellbore. An example of a suitable filler includes dolomite powder ($MgCaCO_3$).

In some examples, the Sorel cement compositions may include a viscosifier. Examples of suitable viscosifiers include polysaccharide-hydroxyethyl cellulose, carboxymethyl hydroxypropyl guar, hydroxypropyl guar, derivatized hydroxyethyl cellulose, and biopolymers, such as xanthan and diutan. Combinations of suitable viscosifiers may be used in some embodiments. The viscosifier may be present in the Sorel cement composition in any suitable amount. In some embodiments, the viscosifier may be present in the Sorel cement composition in an amount of from about 0.05% to about 5% by weight of the Sorel cement composition. Alternatively, the viscosifier may be present in an amount of about 0.05% to about 5%, about 0.05% to about 4%, about 0.05% to about 3.5%, about 0.05 to about 3%, about 0.05% to about 2.5%, about 0.05% to about 2%, about 0.05% to about 1.5%, about 0.05% to about 1%, about 0.05 to about 0.5% by weight of the Sorel cement composition.

Set retarders for delaying the time in which the phase transition occurs may also be included in the Sorel cement composition in accordance with one or more embodiments. Set retarders can allow the operator to have more control over the set time of the Sorel cement composition based on the geothermal temperature at which the composition will be used. Increasing the weight percentage of the set retarder should increase the time required for the Sorel cement composition to undergo the phase transition. The set retarder may be used in any suitable amount. For example, the set retarder may be present in the Sorel cement composition in an amount of about 0.5% to about 10% by weight of the metal oxide. Examples of suitable set retarders include sodium hexametaphosphate, potassium magnesium phosphate hexahydrate, and potassium magnesium hexametaphosphate. Mixtures of these set retarders may also be used. The set retarders may be water soluble and can be added to the water before addition of the soluble salt to the water. The set retarder can be added at other times, such as after formation of the brine.

Accelerating agents for increasing the rate at which the flowable slurry forms the solid mass may also be incorporated into the Sorel cement composition, in accordance with one or more embodiments. Where used, the accelerating agent may be present in the Sorel cement composition in an amount of about 1% to 10% by weight of the Sorel cement composition. An example of a suitable accelerating agent includes aluminum sulfate.

A weighting agent may also be included in the Sorel cement composition in accordance with one or more embodiments. Weights agents may be used, for example, to control slurry mass and/or density. Control of slurry mass can be important for positioning the Sorel cement composition properly in the wellbore. Slurry mass and density generally should be sufficient to displace pressurized and dense fluids in the wellbore. Examples of suitable weighting agents include calcium carbonate, barite, galena, and combinations thereof.

The Sorel cement compositions as described herein may include properties that would be beneficial for use in downhole sealant applications, including lost circulation control, water shutoff, and plugging operations, among others. For example, the Sorel cement compositions may develop static gel strength in a short time frame enabling them to be effective at lost circulation control and water shutoff. By way of further example, the Sorel cement compositions may set to form a hardened mass with sufficient compressive strength to support well structures. Additionally, the Sorel cement compositions may be thixotropic (e.g., shear-thinning or shear-sensitive) so that the fluids should remain pumpable long enough for placement, but when static, should develop gel strength quickly.

A method of subterranean treatment may be provided. The method may include introducing a Sorel cement composition as described herein into lost circulation treatment fluid into a subterranean formation and allowing the Sorel cement composition to set in the subterranean formation. Introduction of the Sorel cement composition into a subterranean formation includes introducing into a wellbore in the subterranean formation or into a formation zone, such as water-producing zone or a lost circulation zone. For example, the Sorel cement composition may be placed into a lost circulation zone to form a seal that reduces loss of fluid circulation into the lost circulation zone. By way of further example, the Sorel cement composition may be placed into a water-producing zone to form a seal that reduces water production from the water-producing zone. The Sorel cement composition used in this method of subterranean treatment may contain the various features of the embodiments of the Sorel cement composition used described herein. The Sorel cement compositions disclosed herein may be used in any suitable life-cycle stage of a wellbore, such as, for example, during a drilling operation, a completion operation, or a production stage, etc.

The Sorel cement composition used may be a thixotropic shear-thinning fluid. A thixotropic fluid is generally described as a fluid that becomes more viscous when flow ceases. It often may develop a gel that requires sufficient shear stress to overcome this static gelling phenomenon for flow to begin. Once flow begins, a shear thinning or pseudoplastic fluid is one whose apparent viscosity (apparent viscosity being defined as the ratio of shear stress to shear rate) decreases as shear rate increases. Dilatant (shear thickening) fluids are those whose apparent viscosity increases as shear rate increases. The Herschel-Bulkley (HB) fluid model can be used to viscometrically classify fluids both as shear-thinning (pseudoplastic) or shear thickening (dilatant). The HB model is expressed by the following equation:

$$\tau = \mu_\infty \gamma^n + \tau_0$$

where $\tau$ is the shear stress, $\mu_\infty$ is the consistency coefficient of the fluid, $\gamma$ is the shear rate, n is the shear-thinning index, and $\tau_0$ is the yield stress. A shear-thinning index of less than 1 indicates that the fluid is shear-thinning, whereas a value of n that is greater than 1 indicates that the fluid is shear-thickening. Thus, a shear-thinning fluid must have a shear-thinning index of less than 1 when measured according to the Herschel-Bulkley model. The thixotropic and shear-thinning dual nature of Sorel cement composition will therefore remain fluid while exposed to the agitation of pumping (or any other agitation), however, when the Sorel cement composition flows into a subterranean zone and away from a source of agitation the Sorel cement composition should thicken to seal the subterranean zone and prevent fluid migration into (or from) the subterranean zone.

In lost circulation embodiments, a Sorel cement composition as described herein may be used. As previously mentioned, lost circulation zones are often encountered into which drilling fluid may be lost. As a result, drilling typically must be terminated with the implementation of remedial procedures, for example. In accordance with embodiments, the lost circulation treatment fluids may be used to seal the lost circulation zones to prevent the uncontrolled flow of treatment fluids into or out of the lost circulation zones, e.g., lost drilling fluid circulation, crossflows, underground blowouts and the like. In some embodiments, a Sorel cement composition as described herein may be prepared. After preparation, the Sorel cement composition may be introduced into the lost circulation zone. In an embodiment, the Sorel cement composition is pumped through one or more openings at the end of the string of drill pipe. For example, the Sorel cement composition may be pumped through the drill bit. Once placed into the lost circulation treatment zone, the Sorel cement composition should set to form a hardened mass inside the lost circulation zone. This hardened mass should seal the zone and control the loss of subsequently pumped drilling fluid, which allows for continued drilling. In addition to drilling fluids, embodiments of the Sorel cement composition may also be used to control lost circulation problems encountered with other treatment fluids, for example, spacer fluids, completion fluids (e.g., completion brines), fracturing fluids, and cement compositions (set-delayed or otherwise) that may be placed into a wellbore.

FIG. 1 is a schematic diagram that illustrates a system 100 for preparation and delivery of a Sorel cement composition including waterproofing agents as described herein in accordance with certain examples in the present disclosure. As shown, the cement composition may be mixed in mixing equipment 102, such as a jet mixer, re-circulating mixer, or a batch mixer, for example, and then pumped via pumping equipment 104 to the wellbore. In some systems, methods and compositions, the mixing equipment 102 and the pumping equipment 104 may be disposed on one or more cement trucks as will be apparent to those of ordinary skill in the art. In some systems, methods and compositions, a jet mixer may be used, for example, to continuously mix the Sorel cement composition including waterproofing agents with yellow/green environmental ratings as it is being pumped to the wellbore.

An example technique for placing a Sorel cement composition including waterproofing agents as described into a subterranean formation will now be described with reference to FIGS. 2A and 2B. FIG. 2A is a schematic diagram that illustrates surface equipment 200 that may be used for introduction and placement of the Sorel cement composition including waterproofing agents with yellow/green environmental ratings into a subterranean formation in accordance with certain examples in the present disclosure. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 200 may include a cementing unit 202, which may include one or more cement trucks. The cementing unit 202 may include mixing equipment 102 and pumping equipment 104 (e.g., FIG. 1) as will be apparent to those of ordinary skill in the art. The cementing unit 202 may pump a Sorel cement composition 204 through a feed pipe 206 and to a cementing head 208 which conveys the Sorel cement composition 204 downhole.

Turning now to FIG. 2B, wherein FIG. 2B is a schematic diagram that illustrates placement of a Sorel cement composition 204 into a wellbore annulus in accordance with certain examples in the present disclosure. The Sorel cement composition 204 may be placed into a subterranean formation 214 in accordance with example systems, methods and cement compositions. As illustrated, a wellbore 216 may be drilled into the subterranean formation 214. While wellbore 216 is shown extending generally vertically into the subterranean formation 214, the principles described herein are also applicable to wellbores that extend at an angle through the subterranean formation 214, such as horizontal and slanted wellbores. As illustrated, the wellbore 216 includes walls 218. In the illustration, a surface casing 220 has been inserted into the wellbore 216. The surface casing 220 may be cemented to the walls 218 of the wellbore 216 by cement sheath 222. In the illustration, one or more additional conduits (e.g., intermediate casing, production casing, liners, etc.), shown here as casing 224 may also be disposed in the wellbore 216. As illustrated, there is a wellbore annulus 226 formed between the casing 224 and the walls 218 of the wellbore 216 and/or the surface casing 220. One or more centralizers 228 may be attached to the casing 224, for example, to centralize the casing 224 in the wellbore 216 prior to and during the cementing operation.

With continued reference to FIG. 2B, the Sorel cement composition 204 may be pumped down the interior of the casing 224. The Sorel cement composition 204 may be allowed to flow down the interior of the casing 224 through the casing shoe 232 at the bottom of the casing 224 and up around the casing 224 into the wellbore annulus 226. The Sorel cement composition 204 may be allowed to set in the wellbore annulus 226, for example, to form a cement sheath that supports and positions the casing 224 in the wellbore 216. While not illustrated, other techniques may also be utilized for introduction of the Sorel cement composition 204. By way of example, reverse circulation techniques may be used that include introducing the Sorel cement composition 204 into the subterranean formation 214 by way of the wellbore annulus 226 instead of through the casing 224. By way of further example, the Sorel cement composition 204 may be placed into the wellbore 216 at stages, such as during drilling or production, for example.

As it is introduced, the Sorel cement composition 204 may displace other fluids 230, such as drilling fluids and/or spacer fluids that may be present in the interior of the casing 224 and/or the wellbore annulus 226. At least a portion of the displaced fluids 230 may exit the wellbore annulus 226 via a flow line 210 and be deposited, for example, in one or more retention pits 212 (e.g., a mud pit), as shown on FIG. 2A. Referring again to FIG. 2B, a bottom plug 234 may be introduced into the wellbore 216 ahead of the Sorel cement composition 204, for example, to separate the Sorel cement composition 204 from the fluids 230 that may be inside the casing 224 prior to cementing. After the bottom plug 234 reaches the landing collar 236, a diaphragm or other suitable device should rupture to allow the Sorel cement composition 204 through the bottom plug 234. In FIG. 2B, the bottom plug 234 is shown on the landing collar 236. In the illustration, a top plug 238 may be introduced into the wellbore 216 behind the Sorel cement composition 204. The top plug 238 may separate the Sorel cement composition 204 from a displacement fluid 240 and also push the Sorel cement composition 204 through the bottom plug 234.

FIG. 3 illustrates an example technique for the placement of a Sorel cement composition 300 as described herein into a subterranean zone, shown as lost circulation zone 302. Such an embodiment may be used, for example, when it is desired to reduce the loss of drilling fluid into a lost circulation zone 302. As illustrated, wellbore 304 may be drilled into the subterranean formation 306. While wellbore 304 is shown extending generally vertically into the subterranean formation 306, the principles described herein are also applicable to wellbores that extend at an angle through the subterranean formation 306, such as horizontal and slanted wellbores. As illustrated, the wellbore 304 includes walls 308 with a lost circulation zone 302. In the illustrated embodiment, a surface casing 310 has been inserted into the wellbore 304. The surface casing 310 may be cemented to the walls 308 of the wellbore 304 by cement sheath 312. In the illustrated embodiment, one or more additional conduits (e.g., pipe string, drill string, production tubing) shown here as conduit 314 may also be disposed in the wellbore 304. As illustrated, there is a wellbore annulus 316 formed between the conduit 314 and the walls 308 of the wellbore 304. One or more centralizers 318 may be attached to the conduit 314, for example, to centralize the conduit 314 in the wellbore 304 prior to and during the downhole operations.

With continued reference to FIG. 3, the Sorel cement composition 300 may be pumped down the interior of the conduit 314. A plug 320 may separate the Sorel cement composition 300 from a displacement fluid 322 and also push the Sorel cement composition 300 through the conduit 314. The Sorel cement composition 300 may be allowed to flow down the interior of the conduit 314, through the bottom of the conduit 314, and up around the conduit 314 into the wellbore annulus 316. As the Sorel cement composition 300 flows upward through the wellbore annulus 316, Sorel cement composition 300 may flow into lost circulation zone 302 and may become static if sufficiently removed from a shear force. If static, Sorel cement composition 300 may rapidly develop gel strength. Once sufficiently set, Sorel cement composition 300 may then seal lost circulation zone 302 and prevent the loss of any treatment fluids (not shown) that subsequently flow adjacent to lost circulation zone 302. While not illustrated, other techniques may also be utilized for introduction of the Sorel cement composition 300.

Accordingly, this disclosure describes systems, methods, and compositions that may relate to subterranean operations, and, more particularly, to subterranean cementing operations including magnesium oxychloride (Sorel) cement compositions including organically modified clays or silica as waterproofing agents. The systems, methods, and compositions may further be characterized by one or more of the following statements.

Statement 1. A cement composition comprising: an alkaline earth metal oxide, a soluble salt, a water-proofing agent comprising a divalent cation carbonate coated with fatty acid, and water.

Statement 2. The cement composition of Statement 1, wherein the divalent cation carbonate comprises at least one divalent cation carbonate selected from the group consisting of calcium carbonate, magnesium carbonate, strontium carbonate, zinc carbonate, and any combination thereof.

Statement 3. The cement composition of any one of Statements 1-2, wherein the divalent cation carbonate comprises calcium carbonate.

Statement 4. The cement composition of any one of Statements 1-3, wherein the fatty acid comprises at least one fatty acid selected from the group consisting of butyric acid, caprylic acid, capric acid, lauric acid, myristic acid, palmitic acid, stearic acid, arachidic acid, behenic acid, lignoceric acid, cerotic acid, and any combination thereof.

Statement 5. The cement composition of any one of Statements 1-4, wherein the fatty acid comprises stearic acid.

Statement 6. The cement composition of any one of Statements 1-5, wherein the divalent cation carbonate coated with fatty acid comprises calcium carbonate coated with stearic acid.

Statement 7. The cement composition of any one of Statements 1-6, further comprising modified clay.

Statement 8. The cement composition of any one of Statements 1-7, further comprising at least one viscosifier selected from the group consisting of xanthan, diutan, hydroxy propyl guar, carboxy methyl hydroxy propyl guar, and any combinations thereof.

Statement 9. The cement composition of any one of Statements 1-8, wherein the alkaline earth metal oxide comprises magnesium oxide and the soluble salt comprises magnesium chloride.

Statement 10. The cement composition of any one of Statements 1-9, wherein the alkaline earth metal oxide is present in an amount of about 10% to about 50% by weight of the Sorel cement composition, and wherein the soluble salt is present in an amount of about 10% to about 50% by weight of the cement composition, and wherein the alkaline earth metal oxide is magnesium oxide, and wherein the soluble salt is magnesium chloride.

Statement 11. The cement composition of any one of Statements 1-10, wherein the cement composition has a metal oxide to soluble salt ratio of about 1:3 to about 3:1.

Statement 12. A method comprising: introducing a cement composition comprising: an alkaline earth, metal oxide, a soluble salt, a water-proofing agent comprising a divalent cation carbonate coated with fatty acid, and water; and allowing the cement composition to set in the subterranean formation.

To facilitate a better understanding of the present invention, the following examples of certain aspects of some embodiments are given. In no way should the following examples be read to limit, or define, the entire scope of the disclosure.

EXAMPLE

This example was performed to evaluate the viscosities of the Sorel cement compositions with and without calcium carbonate coated with stearic acid. The primary constituents of Sample 1 and Sample 2 includes 35 wt % magnesium oxide, 35 wt % magnesium chloride, and 30 wt % water. The formulation also incorporates a retarder (sodium hexametaphosphate ($Na_6[PO_3]_6$)) and a suspending aid (diutan). The quantities of sodium hexametaphosphate and diutan used for the tests are captured in Table 1 below. Additionally, Sample No. 1 has modified clay (20 wt % MgO) while Sample No. 2 has modified clay (4 wt % MgO) and 4 wt % calcium carbonate coated with stearic acid as described in Table 1 below.

TABLE 1

| Sorel Cement Compositions and their Corresponding Time to reach 70 BC. | | | | | | | | |
|---|---|---|---|---|---|---|---|
| Formulation | MgO | MgCl$_2$ | Water | ($Na_6[PO_3]_6$) by wt of (MgO) | Diutan | Modified Clay by wt of (MgO) | CaCO$_3$ coated with C$_{18}$H$_{36}$O$_2$ | Time to reach 70 BC |
| Sample No. 1 | 45 g | 45 g | 37.5 g | 3.5 wt % | 15 ppt | 20 wt % | 0 wt % | <1 hour |
| Sample No 2 | 45 g | 45 g | 37.5 g | 3.5 wt % | 15 ppt | 2 wt % | 4 wt % of MgO | 2 hours 57 min. |

Statement 13. The method of Statement 12, wherein the cement composition is introduced into a lost circulation zone in the subterranean formation and is allowed to set to seal the lost circulation zone.

Statement 14. The method of any one of Statements 12-13, wherein the cement composition is introduced into a water-producing zone in the subterranean formation and is allowed to seal the water-producing zone.

Statement 15. The method of any one of Statements 12-14, wherein the cement composition sets to seal off one or more subterranean zones.

Statement 16. The method of any one of Statements 12-15, wherein the divalent cation carbonate comprises at least one divalent cation carbonate selected from the group consisting of calcium carbonate, magnesium carbonate, strontium carbonate, zinc carbonate, and any combination thereof.

Statement 17. The method of any one of Statements 12-16, wherein the divalent cation carbonate comprises calcium carbonate.

Statement 18. The method of any one of Statements 12-17, wherein the fatty acid comprises at least one fatty acid selected from the group consisting of butyric acid, caprylic acid, capric acid, lauric acid, myristic acid, palmitic acid, stearic acid, arachidic acid, behenic acid, lignoceric acid, cerotic acid, and any combination thereof.

Statement 19. The method of any one of Statements 12-18, wherein the fatty acid comprises stearic acid.

Statement 20. The method of any one of Statements 12-19, wherein the divalent cation carbonate coated with fatty acid comprises calcium carbonate coated with stearic acid.

Sample No. 1 with its 20 wt % modified clay (by weight of MgO) had a viscosity of 255 cP at 300 rpm using a Fann 35 viscometer. In contrast, Sample No. 2 with its 2 wt % modified clay (by weight of MgO) and 4 wt % (by weight of MgO) calcium carbonate coated with stearic acid had a viscosity of 145 cP at 300 rpm. The lower viscosity of Sample No. 2 improves the mixability of the system, making the mixing process easier, and the system handling operation in the field much friendlier. Therefore, reducing the concentration of modified clay and replacing it at least partly with calcium carbonate coated with stearic acid provide significant operational advantages.

The following experiment was performed to evaluate the thermal stability of Sample No. 1 as compared to the thermal stability of Sample No. 2 described in Example 1 by measuring their unconfined compressive strength (UCS) after 2 weeks, 3 weeks, and 5 weeks.

The tests were performed by first mixing the slurry components in the following order: 1) water, 2) sodium hexametaphosphate ($Na_6[PO_3]_6$], 3) gelling agent (diutan), 4) magnesium chloride, 5) magnesium oxide, and 6) modified clay/CaCO$_3$ coated with C$_{18}$H$_{36}$O$_2$. After preparation, the 2-week, 3-week, and 5-week at 55° C. unconfined compressive strengths were determined for each test sample at the indicated temperature in accordance with API RP 10B-2. Recommended Practice for Testing Well Cements. The results of the tests are provided in Table 2 below.

TABLE 2

| | | | | (Na$_6$[PO$_3$)$_6$] | | Modified Clay | CaCO$_3$ coated with C$_{18}$H$_{36}$O$_2$ | UCS Strength after | | |
|---|---|---|---|---|---|---|---|---|---|---|
| Formulation | MgO | MgCl$_2$ | Water | by wt of (MgO) | Diutan | by wt of (MgO) | by wt of (MgO) | 2 weeks | 3 weeks | 5 weeks |
| Sample No. 1 | 45 g | 45 g | 37.5 g | 3.5 wt % | 15 ppt | 20 wt % | 0 wt % | 1946 psi | 300 psi | N/A |
| Sample No. 2 | 45 g | 45 g | 37.5 g | 3.5 wt % | 15 ppt | 2 wt % | 4 wt % | 480 psi | 520 psi | 780 psi |
| Sample No. 3 | 50 g | 50 g | 37.5 g | 3.5 wt % | 15 ppt | | 5 wt % | 2650 | 2252 | N/A |

Effect of the Sorel Cement Composition on Thermal Stability at 55° C.

As illustrated in Table 2 above, the Sorel cement composition without the calcium carbonate coated with stearic acid shows signs of thermal degradation after 3 weeks going from an unconfined compressive strength of 1946 psi to 300 psi, which corresponds to an unconfined compressive strength reduction of 85% from the second week to the third week. The Sorel composition without the calcium carbonate coated with stearic acid even loses all its unconfined compressive strength after 5 weeks.

In contrast, the Sorel cement composition with the calcium carbonate coated with stearic acid shows an increase in unconfined compressive strength over time going from 480 psi after 2 weeks, to 520 psi after 3 weeks, to 780 psi after 5 weeks at 55° C. This increase in unconfined compressive strength at temperatures typically found downhole is important in the field to deliver safe and reliable isolation barrier around the borehole.

Table 1 captures the thickening time measured at 55° C. using Sample No. 1 and Sample No. 2. Sample No. 1 is obtained without coated calcium carbonate while Sample No. 2 is obtained with reduced amount of modified clay with coated calcium carbonate. In Sample No. 2, the addition of the calcium carbonate coated with stearic acid and reduction of the concentration of modified clay provides the corresponding Sorel cement composition a delay time of more than 2 hours which facilitates handling, pumping, and placement of the Sorel cement composition downhole before setting in. This is a significant advantage in field operation.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A cement composition comprising:
an alkaline earth metal oxide;
a soluble salt;
a water-proofing agent comprising a divalent cation carbonate coated with fatty acid;
at least one viscosifier selected from a group consisting of xanthan, diutan, hydroxy propyl guar, carboxy methyl hydroxy propyl guar, and any combinations thereof; and
water, wherein the alkaline earth metal oxide and the soluble salt form a settable cement composition.

2. The cement composition of claim 1, wherein the divalent cation carbonate comprises at least one divalent cation carbonate selected from a group consisting of calcium carbonate, magnesium carbonate, strontium carbonate, zinc carbonate, and any combination thereof.

3. The cement composition of claim 1, wherein the divalent cation carbonate comprises calcium carbonate.

4. The cement composition of claim 1, wherein the fatty acid comprises at least one fatty acid selected from a group consisting of butyric acid, caprylic acid, capric acid, lauric acid, myristic acid, palmitic acid, stearic acid, arachidic acid, behenic acid, lignoceric acid, cerotic acid, and any combination thereof.

5. The cement composition of claim 1, wherein the fatty acid comprises stearic acid.

6. The cement composition of claim 1, wherein the divalent cation carbonate coated with fatty acid comprises calcium carbonate coated with stearic acid.

7. The cement composition of claim 1, further comprising modified clay.

8. The cement composition of claim 1, wherein the alkaline earth metal oxide comprises magnesium oxide and the soluble salt comprises magnesium chloride.

9. The cement composition of claim 1, wherein the alkaline earth metal oxide is present in an amount of about 10% to about 50% by weight of the cement composition, wherein the soluble salt is present in an amount of about 10% to about 50% by weight of the cement composition, wherein the alkaline earth metal oxide is magnesium oxide, and wherein the soluble salt is magnesium chloride.

10. The cement composition of claim 1, wherein the cement composition has a metal oxide to soluble salt ratio of about 1:3 to about 3:1.

11. The cement composition of claim 1, wherein the cement composition has a metal oxide to soluble salt ratio of about 1:2 to about 2:1.

12. A method comprising:

introducing a cement composition comprising:

an alkaline earth metal oxide;

a soluble salt;

a water-proofing agent comprising a divalent cation carbonate coated with fatty acid;

at least one viscosifier selected from a group consisting of xanthan, diutan, hydroxy propyl guar, carboxy methyl hydroxy propyl guar, and any combinations thereof; and water; and allowing the cement composition to set in a subterranean formation, wherein the alkaline earth metal oxide and the soluble salt form a settable cement composition.

13. The method of claim 12, wherein the cement composition is introduced into a lost circulation zone in the subterranean formation and is allowed to set to seal the lost circulation zone.

14. The method of claim 12, wherein the cement composition is introduced into a water-producing zone in the subterranean formation and is allowed to seal the water-producing zone.

15. The method of claim 12, wherein the cement composition sets to seal off one or more subterranean zones.

16. The method of claim 12, wherein the divalent cation carbonate comprises at least one divalent cation carbonate selected from a group consisting of calcium carbonate, magnesium carbonate, strontium carbonate, zinc carbonate, and any combination thereof.

17. The method of claim 12, wherein the divalent cation carbonate comprises calcium carbonate.

18. The method of claim 12, wherein the fatty acid comprises at least one fatty acid selected from a group consisting of butyric acid, caprylic acid, capric acid, lauric acid, myristic acid, palmitic acid, stearic acid, arachidic acid, behenic acid, lignoceric acid, cerotic acid, and any combination thereof.

19. The method of claim 12, wherein the fatty acid comprises stearic acid.

20. The method of claim 12, wherein the divalent cation carbonate coated with fatty acid comprises calcium carbonate coated with stearic acid.

* * * * *